US008919200B2

(12) United States Patent
Watanabe

(10) Patent No.: US 8,919,200 B2
(45) Date of Patent: Dec. 30, 2014

(54) PHYSICAL QUANTITY DETECTION DEVICE, PHYSICAL QUANTITY DETECTOR, AND ELECTRONIC DEVICE

(71) Applicant: Seiko Epson Corporation, Tokyo (JP)

(72) Inventor: Jun Watanabe, Matsumoto (JP)

(73) Assignee: Seiko Epson Corporation (JP)

( * ) Notice: Subject to any disclaimer, the term of this patent is extended or adjusted under 35 U.S.C. 154(b) by 175 days.

(21) Appl. No.: 13/664,710

(22) Filed: Oct. 31, 2012

(65) Prior Publication Data

US 2013/0112019 A1    May 9, 2013

(30) Foreign Application Priority Data

Nov. 7, 2011   (JP) .................................. 2011-243470
Nov. 14, 2011  (JP) .................................. 2011-248654

(51) Int. Cl.
 G01P 15/00    (2006.01)
 G01P 15/097   (2006.01)
 G01P 15/08    (2006.01)

(52) U.S. Cl.
 CPC ....... *G01P 15/097* (2013.01); *G01P 2015/0828* (2013.01)
 USPC ...................................................... 73/514.01

(58) Field of Classification Search
 CPC .......... G01P 15/097; G01P 2015/0828; G01P 15/135
 USPC ................. 73/514.29, 514.37, 579, 778, 510, 73/504.12–504.15, 514.34–514.38, 73/504.02–504.04, 514.01–514.02, 73/862.59, 651–652, 662–663; 310/306, 310/326–328, 360–361; 216/33, 80
 See application file for complete search history.

(56) References Cited

U.S. PATENT DOCUMENTS

| | | | | |
|---|---|---|---|---|
| 5,113,698 A | * | 5/1992 | Grlj et al. ................... | 73/862.59 |
| 5,165,279 A | * | 11/1992 | Norling et al. ............. | 73/514.14 |
| 5,331,854 A | | 7/1994 | Hulsing, II | |
| 2010/0064813 A1 | * | 3/2010 | Nishizawa et al. ............ | 73/651 |
| 2011/0209330 A1 | * | 9/2011 | Saito ............................... | 29/428 |

FOREIGN PATENT DOCUMENTS

| | | |
|---|---|---|
| JP | 04-505509 | 9/1992 |
| JP | 2011-169671 | 9/2011 |
| WO | 91-13328 | 9/1991 |

* cited by examiner

*Primary Examiner* — Peter Macchiarolo
*Assistant Examiner* — Anthony W Megna Fuentes
(74) *Attorney, Agent, or Firm* — Harness, Dickey & Pierce, P.L.C.

(57) ABSTRACT

A physical quantity detection device includes: a base; a movable portion, provided in the base through a coupling portion, which is displaced in accordance with a change in a physical quantity; a physical quantity detection element which is fixed across the base and the movable portion; and a mass portion which is fixed to the movable portion, wherein the movable portion includes a first fixing portion to which the physical quantity detection element is fixed, a second fixing portion to which the mass portion is fixed, and a notch having a notched shape which is separated from the coupling portion, and reaches from a lateral side of the movable portion to a place intersecting a line that links the first fixing portion to the second fixing portion.

20 Claims, 11 Drawing Sheets

PHYSICAL QUANTITY DETECTION DEVICE, PHYSICAL QUANTITY DETECTOR, AND ELECTRONIC DEVICE

BACKGROUND

1. Technical Field

The present invention relates to a physical quantity detection device, a physical quantity detector, and an electronic device.

2. Related Art

Hitherto, physical quantity detection devices (for example, acceleration sensors) making use of a physical quantity detection element such as a vibrator (resonator) have become known. When a resonance frequency of the physical quantity detection element changes with the action of force in the detection axis direction, such physical quantity detection devices are configured to detect force (acceleration) applied to the physical quantity detection device due to a change in the resonance frequency.

In such a physical quantity detection device, for example, a mass portion is provided in a movable portion which is displaced when acceleration is applied, and detection sensitivity of the acceleration is increased (see JP-A-2011-169671).

However, in a technique disclosed in JP-A-2011-169671, since thermal expansion coefficients of the movable portion and the mass portion are different from each other, stress has sometimes occurred in the movable portion due to the difference between both thermal expansion coefficients. Such stress has sometimes been transmitted to the physical quantity detection element. As a result, detection sensitivity of the physical quantity detection device has sometimes decreased due to a fluctuation in the resonance frequency of the physical quantity detection element by the transmitted stress.

SUMMARY

An advantage of some aspects of the invention is to provide a physical quantity detection device capable of suppressing transmission of stress to a physical quantity detection element. Another advantage of some aspects of the invention is to provide a physical quantity detector and an electronic device which have the above-mentioned physical quantity detection device.

Application Example 1

This application example 1 is directed to a physical quantity detection device including: a base; a movable portion, provided in the base through a coupling portion, which is displaced in accordance with a change in a physical quantity; a physical quantity detection element which is fixed across the base and the movable portion; and a mass portion which is fixed to the movable portion, wherein the movable portion includes a first fixing portion to which the physical quantity detection element is fixed, a second fixing portion to which the mass portion is fixed, and a notch having a notched shape which is separated from the coupling portion, and reaches from a lateral side of the movable portion to a place intersecting a line that links the first fixing portion to the second fixing portion.

According to such a physical quantity detection device, even when stress occurs in the movable portion (second fixing portion) due to the difference between thermal expansion coefficients of the movable portion and the mass portion, it is possible to suppress the transmission of the stress to the first fixing portion by the notch. That is, it is possible to suppress the transmission of the stress to the physical quantity detection element. As a result, such a physical quantity detection device can have a high detection sensitivity.

Application Example 2

In the physical quantity detection device according to the application example, the notch may be provided passing from one main surface of the movable portion to the other main surface thereof.

According to such a physical quantity detection device, it is possible to further suppress the transmission of stress to the physical quantity detection element compared with, for example, the case where the notch has a bottom.

Application Example 3

In the physical quantity detection device according to the application example, the notch may have a bottom.

According to such a physical quantity detection device, it is possible to further increase the rigidity of the movable portion compared with the case where the notch passes from one main surface of the movable portion to the other main surface thereof. For this reason, when the acceleration is applied to the physical quantity detection device, the movable portion can be more stably operated without being distorted.

Application Example 4

In the physical quantity detection device according to the application example, the notch may be provided at a position which does not overlap the physical quantity detection element when seen in plan view.

According to such a physical quantity detection device, it is possible to suppress a decrease in the sensitivity of the physical quantity detection element by the notch.

Application Example 5

In the physical quantity detection device according to the application example, the notch may include a structure extending in a direction intersecting a rotation-axis direction of the movable portion, a first leg having the first fixing portion and a second leg having the second fixing portion may be provided by the notch, the second leg may have a difference in rigidity along the rotation-axis direction, further toward the coupling portion side than the second fixing portion, and the rigidity of the second leg may be lower on the first leg side than on the opposite side thereto.

According to such a physical quantity detection device, since the rigidity of the second leg is higher on the opposite side to the first leg side than that, it is possible to increase the rigidity in the vicinity of the second fixing portion of the movable portion, particularly, when the second fixing portion is provided on the second leg on the opposite side to the first leg along the rotation-axis direction of the movable portion (along the X-axis). Therefore, it is possible to suppress torsion occurring in the movable portion, and to suppress a decrease in the detection sensitivity of the acceleration.

Application Example 6

In the physical quantity detection device according to the application example, the second leg may include an opening further on the coupling portion side than the second fixing portion.

According to such a physical quantity detection device, even when stress occurs in the movable portion (second fixing portion) due to the difference between thermal expansion coefficients of the movable portion and the mass portion, it is possible to further suppress the transmission of the stress to the first fixing portion by the opening. That is, it is possible to further suppress the transmission of the stress to the physical quantity detection element.

Application Example 7

In the physical quantity detection device according to the application example, the second leg may include a first beam which is provided between the opening and the notch, and a second beam which is provided between the opening and the lateral side of the movable portion along a direction intersecting the rotation-axis direction, and the rigidity of the first beam may be lower than the rigidity of the second beam.

According to such a physical quantity detection device, it is possible to suppress torsion occurring in the movable portion, and to suppress a decrease in the detection sensitivity of the acceleration.

Application Example 8

This application example is directed to a physical quantity detection device including: a base; a movable portion, provided in the base through a coupling portion, which is displaced in accordance with a change in a physical quantity; a physical quantity detection element which is fixed across the base and the movable portion; and a mass portion which is fixed to the movable portion, wherein the movable portion includes a first fixing portion to which the physical quantity detection element is fixed, a second fixing portion to which the mass portion is fixed, and a hole which is separated from the coupling portion, and intersects a line that links the first fixing portion to the second fixing portion.

According to such a physical quantity detection device, even when stress occurs in the movable portion (second fixing portion) due to the difference between thermal expansion coefficients of the movable portion and the mass portion, it is possible to suppress the transmission of the stress to the first fixing portion by the hole. That is, it is possible to suppress the transmission of the stress to the physical quantity detection element. As a result, such a physical quantity detection device can have a high detection sensitivity.

Application Example 9

In the physical quantity detection device according to the application example, the hole may be provided passing from one main surface of the movable portion to the other main surface thereof.

According to such a physical quantity detection device, it is possible to further suppress the transmission of stress to the physical quantity detection element compared with, for example, the case where the hole has a bottom.

Application Example 10

In the physical quantity detection device according to the application example, the hole may have a bottom.

According to such a physical quantity detection device, it is possible to further increase the rigidity of the movable portion compared with the case where the hole passes from one main surface of the movable portion to the other main surface thereof. For this reason, when the acceleration is applied to the physical quantity detection device, the movable portion can be more stably operated without being distorted.

Application Example 11

In the physical quantity detection device according to the application example, the hole may be provided at a position which does not overlap the physical quantity detection element when seen in plan view.

According to such a physical quantity detection device, it is possible to suppress a decrease in the sensitivity of the physical quantity detection element by the hole.

Application Example 12

In the physical quantity detection device according to the application example, the movable portion may include a plurality of openings, the second fixing portion may be surrounded by the hole and the plurality of openings, the movable portion may include a support of which a shape is defined by the hole and the plurality of openings, and the second fixing portion may be supported by the support.

According to such a physical quantity detection device, even when stress occurs in the movable portion (second fixing portion) due to the difference between thermal expansion coefficients of the movable portion and the mass portion, it is possible to further suppress the transmission of the stress to the first fixing portion by a plurality of openings.

Application Example 13

This application example is directed to a physical quantity detector including: the physical quantity detection device according to any one of Application Examples 1 to 3 and Application Examples 8 to 10; and a package that receives the physical quantity detection device.

Such a physical quantity detector includes the physical quantity detection device according to Application Examples, and thus can have a high detection sensitivity.

Application Example 14

This application example is directed to an electronic device including the physical quantity detection device according to any one of Application Examples 1 to 3 and Application Examples 8 to 10.

Such an electronic device includes the physical quantity detection device according to Application Examples, and thus can have a high detection sensitivity.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment 1.1. Physical Quantity Detection Device

Figure 1:
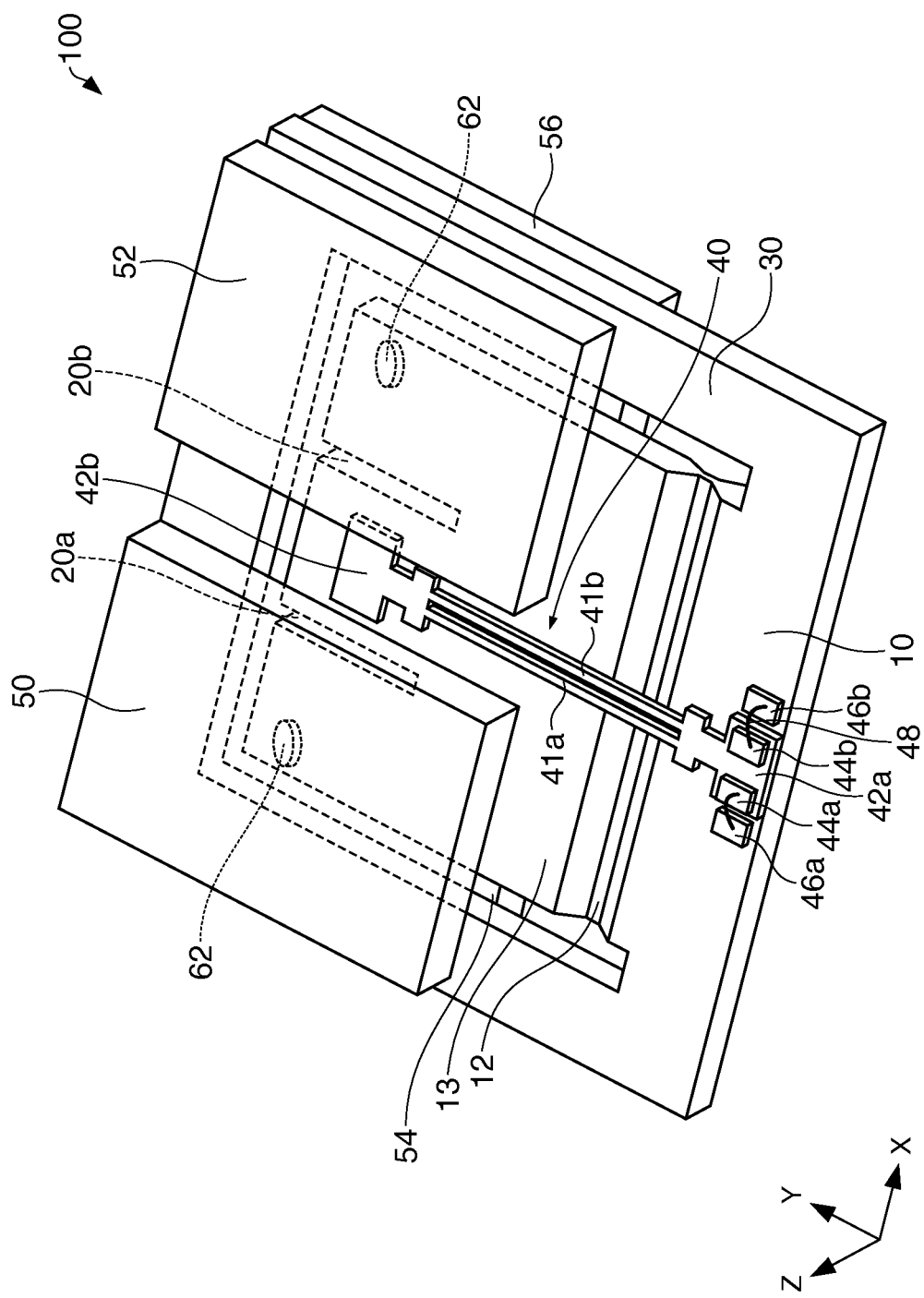
FIG. 1 is a perspective view schematically illustrating a physical quantity detection device according to a first embodiment.
Figure 2:
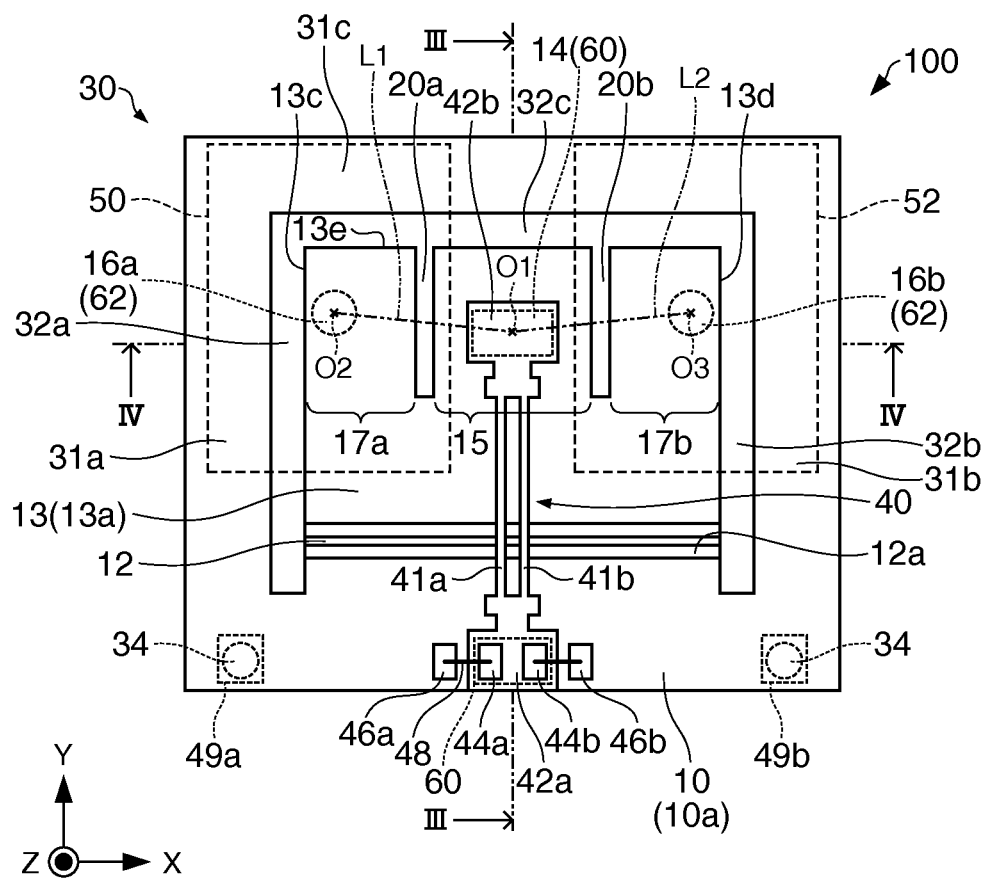
FIG. 2 is a plan view schematically illustrating the physical quantity detection device according to the first embodiment.
Figure 3:
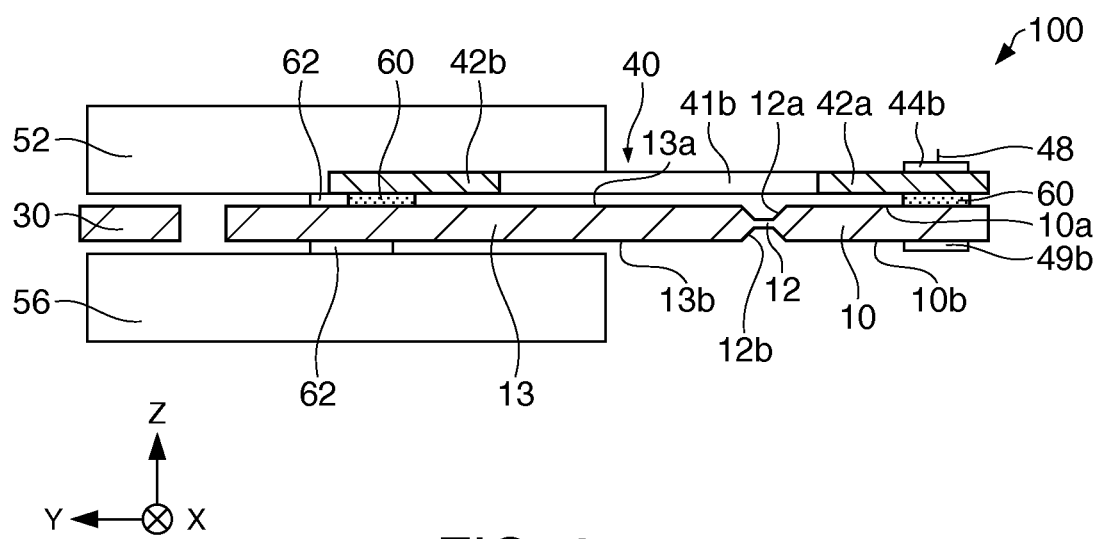
FIG. 3 is a cross-sectional view schematically illustrating the physical quantity detection device according to the first embodiment.
Figure 4:
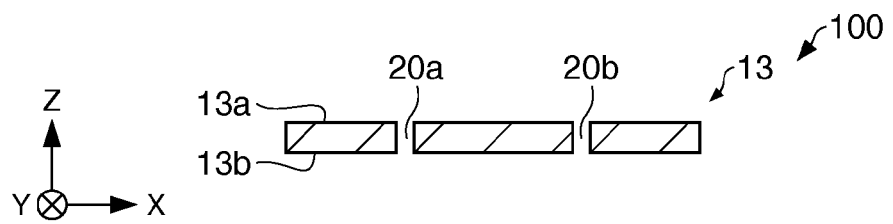
FIG. 4 is a cross-sectional view schematically illustrating the physical quantity detection device according to the first embodiment.

First, a physical quantity detection device according to a first embodiment will be described with reference to the drawings. FIG. 1 is a perspective view schematically illustrating a physical quantity detection device 100 according to the first embodiment. FIG. 2 is a plan view schematically illustrating the physical quantity detection device 100 according to the first embodiment. FIG. 3 is a cross-sectional view taken along the line III-III of FIG. 2 which schematically illustrates the physical quantity detection device 100 according to the first embodiment. FIG. 4 is a cross-sectional view taken along the line IV-IV of FIG. 2 which schematically illustrates the physical quantity detection device 100 according to the first embodiment. Meanwhile, in FIG. 1 to FIG. 4 and FIGS. 5 to 15 described later, the X-axis, the Y-axis, and the Z-axis are shown as three axes which are at right angles to one another, for illustrative convenience.

As shown in FIG. 1 to FIG. 4, the physical quantity detection device 100 includes a base 10, a coupling portion 12, a movable portion 13, a physical quantity detection element 40, and mass portions 50 and 52. Further, the physical quantity detection device 100 can include a frame 30, and mass portions 54 and 56.

Meanwhile, in FIG. 2 and FIGS. 8 and 9 described later, the mass portions 50, 52, 54, and 56 are shown in perspective for illustrative convenience. In addition, only the movable portion 13 is shown in FIG. 4.

The base 10 supports the movable portion 13 through the coupling portion 12. The base 10 is, for example, plate-shaped, and has main surfaces 10a and 10b (facing each other) which are directed to the opposite sides to each other.

The coupling portion 12 is provided between the base 10 and the movable portion 13, and is connected to the base 10 and the movable portion 13. The thickness of the coupling portion 12 is smaller than the thickness of the base 10 and the thickness of the movable portion 13. For example, the coupling portion 12 can be formed by forming groove portions 12a and 12b (see FIG. 3) through half-etching from both main surface sides of a quartz crystal substrate. In the example shown, the groove portions 12a and 12b are formed along the X-axis. The coupling portion 12 can serve as a rotation axis of the movable portion 13 along the X-axis as a fulcrum (intermediate hinge) when the movable portion 13 is displaced (rotated) with respect to the base 10.

The movable portion 13 is connected to the base 10 through the coupling portion 12. That is, the movable portion 13 is provided in the base 10 through the coupling portion 12. In the example shown, the movable portion 13 is extended out along the Y-axis (first axis) from the base 10 through the coupling portion 12.

The movable portion 13 is plate-shaped, and has main surfaces 13a and 13b (facing each other) which are directed to the opposite sides to each other. Further, the movable portion 13 can have lateral sides 13c, 13d, and 13e which are connected to the main surfaces 13a and 13b. As shown in FIG. 2, the lateral sides 13c and 13d are the sides along the Y-axis when seen in plan view, and the lateral side 13e is the side along the X-axis which is connected to the lateral sides 13c and 13d. The lateral side 13e may be the lateral side on the opposite side to the coupling portion 12.

The movable portion 13 can be displaced (rotated) in the direction (Z-axis direction) intersecting the main surface 13a using the coupling portion 12 as a fulcrum (rotation axis), in accordance with a change in the physical quantity (acceleration) applied to the direction (Z-axis direction) intersecting the main surface 13a (13b).

The movable portion 13 includes a first fixing portion 14 and second fixing portions 16a and 16b. The first fixing portion 14 is the portion to which the physical quantity detection element 40 (basal portion 42b) is fixed. The first fixing portion 14 may be the portion in which a bonding member 60 for fixing the physical quantity detection element 40 to the movable portion 13 is disposed. The planar shape of the first fixing portion 14 is not particularly limited, but is rectangular in the example shown in FIG. 2.

The second fixing portions 16a and 16b are the portions to which the mass portion 50 and 52 are fixed. More specifically, the second fixing portion 16a is the portion to which the mass portion 50 is fixed, and the second fixing portion 16b is the portion to which the mass portion 52 is fixed. The second fixing portions 16a and 16b may be the portions in which a bonding member 62 for fixing the mass portions 50 and 52 to the movable portion 13 is disposed. The planar shape of the second fixing portions 16a and 16b is not particularly limited, but is circular in the example shown in FIG. 2.

The movable portion 13 includes notches 20a and 20b. In the example shown, the notches 20a and 20b are provided along the Y-axis (along the direction intersecting the rotation-axis direction of the movable portion 13) from the lateral side 13e of the movable portion 13 toward the coupling portion 12 side. The notches 20a and 20b are separated from the coupling portion 12, and are provided at positions which do not overlap the physical quantity detection element 40 when seen in plan view as shown in FIG. 2. As shown in FIG. 4, the notches 20a and 20b are provided passing from one main surface 13a of the movable portion 13 from the other main surface 13b.

As shown in FIG. 2, the notch 20a is provided intersecting the line L1 (virtual line L1) that links the first fixing portion 14 to the second fixing portion 16a. That is, the notch 20a has a notched shape reaching from the lateral side 13e of the movable portion 13 to a place intersecting the line L1. More specifically, the line L1 is the line that links the center O1 of the first fixing portion 14 to the center O2 of the second fixing portion 16a.

The notch 20b is provided intersecting the line L2 (virtual line L2) that links the first fixing portion 14 to the second fixing portion 16b. That is, the notch 20b has a notched shape reaching from the lateral side 13e of the movable portion 13 to a place intersecting the line L2. More specifically, the line L2 is the line that links the center O1 of the first fixing portion 14 to the center O3 of the second fixing portion 16b.

The movable portion 13 is provided with a first leg 15 having the first fixing portion 14 and second legs 17a and 17b having the second fixing portions 16a and 16b, based on the notches 20a and 20b. More specifically, the second leg 17a has the second fixing portion 16a, and the second leg 17b has the second fixing portion 16b.

In the example shown, the first leg 15 is provided between the notches 20a and 20b. The second leg 17a is provided between the notch 20a and a gap 32a (gap between the movable portion 13 and an extended portion 31a of the frame 30). The second leg 17b is provided between the notch 20b and a gap 32b (gap between the movable portion 13 and an extended portion 31b of the frame 30).

Meanwhile, when the notches 20a and 20b, although not shown, are provided intersecting the lines L1 and L2 so as not to overlap the physical quantity detection element 40, the notch 20a may be provided along the X-axis from the lateral side 13c of the movable portion 13, and the notch 20b may be provided along the X-axis from the lateral side 13d of the movable portion 13.

The frame 30 is provided along the movable portion 13 with a gap interposed therebetween, and is connected to the base 10. The movable portion 13 is surrounded by the frame 30 and the base 10. In the example shown, the frame 30 includes the extended portion 31a provided along the Y-axis through the movable portion 13 and the gap 32a, the extended portion 31b provided along the Y-axis through the movable portion 13 and the gap 32b, and an extended portion 31c provided along the X-axis through the movable portion 13 and a gap 32c. The extended portion 31a is disposed opposite to the second leg 17a with the gap 32a interposed therebetween, and the extended portion 31b is disposed opposite to the second leg 17b with the gap 32b interposed therebetween. The extended portion 31c is connected to the extended portion 31a and the extended portion 31b.

When the physical quantity detection device 100 is mounted to an external member such as a package, the frame 30 can include a package fixing portion 34 fixed to the package. The package fixing portion 34 may be the portion in which a bonding member for bonding the physical quantity detection device 100 to the package is disposed.

In the example shown in FIG. 2, two package fixing portions 34 are provided, and are disposed in flexures (corners) of the frame 30. The package fixing portions 34 are provided at positions which do not overlap the mass portions 50, 52, 54, and 56 when seen in plan view. Although not shown, two or more package fixing portions 34 may be provided, insofar as they are located at positions which do not overlap the mass portions 50, 52, 54, and 56 when seen in plan view.

The base 10, the coupling portion 12, the movable portion 13, and the frame 30 are formed integrally with each other by patterning, for example, a quartz crystal substrate which is cut out from raw ore of quartz crystal or the like at a predetermined angle through a photolithography technique and an etching technique. Meanwhile, the material of the base 10, the coupling portion 12, the movable portion 13, and the frame 30 is not limited to quartz crystal, but may be a semiconductor material such as glass or silicon.

The physical quantity detection element 40 is fixed across the base 10 and the movable portion 13. The physical quantity detection element 40 can include at least vibrating beams 41a and 41b which are detection portions, and basal portions 42a and 42b.

The detection portion is located between the basal portion 42a and the basal portion 42b and force generated between the basal portion 42a and the basal portion 42b is transmitted, so that physical quantity detection information generated by the detection portion may change. In the present embodiment, for example, the vibrating beams 41a and 41b extend from the basal portion 42a to the basal portion 42b along the extension direction of the movable portion 13 (along the Y-axis). The vibrating beams 41a and 41b are, for example, prismatic in shape. When a drive signal (alternating voltage) is applied to an excitation electrode (not shown) provided in the vibrating beams 41a and 41b, the vibrating beams 41a and 41b can flexurally vibrate so as to be separated from or adjacent to each other along the X-axis.

The basal portions 42a and 42b are connected to both ends of the vibrating beams 41a and 41b. In the example shown, the basal portion 42a is fixed to the main surface 10a of the base 10 through the bonding member 60, and the basal portion 42b is fixed to the main surface 13a (main surface on the same side as the main surface 10a of the base 10) of the movable portion 13 through the bonding member 60. More specifically, the bonding member 60 for fixing the basal portion 42b is provided in the first fixing portion 14 of the movable portion 13. As the bonding member 60, for example, low-melting-point glass, and an Au/Sn alloy film capable of being eutectically bonded are used.

Meanwhile, a predetermined gap is provided between the vibrating beams 41a and 41b, and the base 10 and the movable portion 13 so that the vibrating beams 41a and 41b, and the base 10 and the movable portion 13 do not come into contact with each other at the time of the displacement of the movable portion 13. This gap may be managed by, for example, the thickness of the bonding member 60.

In addition, although not shown, a concave portion formed by half-etching the movable portion 13 may be formed in the main surface 13a of the movable portion 13, and a position between the bonding member 60 and the vibrating beams 41a and 41b when seen in plan view. For example, when the bonding member 60 is extruded from a predetermined position, it is possible to catch the bonding member 60 through the concave portion, and to suppress attachment of the bonding member 60 to the vibrating beams 41a and 41b.

As mentioned above, the physical quantity detection element 40 includes two vibrating beams 41a and 41b, and a pair of basal portions 42a and 42b. For this reason, the physical quantity detection element 40 can be called a tuning bi-fork element (tuning bi-fork type vibrating element).

The physical quantity detection element 40 is formed by patterning, for example, a quartz crystal substrate which is cut out from raw ore of quartz crystal or the like at a predetermined angle through a photolithography technique and an etching technique. Thereby, the vibrating beams 41*a* and 41*b* and the basal portions 42*a* and 42*b* can be formed integrally with each other.

Meanwhile, the material of the physical quantity detection element 40 is not limited to quartz crystal, but may be piezoelectric materials such as lithium tantalate (LiTaO$_3$), lithium tetraborate (Li$_2$B$_4$O$_7$), lithium niobate (LiNbO$_3$), lead zirconate titanate (PZT), zinc oxide (ZnO), and aluminum nitride (AlN), or semiconductor materials, such as silicon, which include piezoelectrics such as zinc oxide (ZnO) and aluminum nitride (AlN) as a film. However, considering a reduction in the difference from linear expansion coefficients of the base 10 and the movable portion 13, the physical quantity detection element 40 is preferably formed of the same material as that of the base 10 and the movable portion 13.

Extraction electrodes 44*a* and 44*b* are, for example, provided on the basal portion 42*a* of the physical quantity detection element 40. The extraction electrodes 44*a* and 44*b* are electrically connected to an excitation electrode (not shown) provided in the vibrating beams 41*a* and 41*b*.

The extraction electrodes 44*a* and 44*b* are electrically connected to connection terminals 46*a* and 46*b* provided on the main surface 10*a* of the base 10 by, for example, a metal wire 48 such as Au and Al. More specifically, the extraction electrode 44*a* is electrically connected to the connection terminal 46*a*, and the extraction electrode 44*b* is electrically connected to the connection terminal 46*b*. The connection terminals 46*a* and 46*b* are electrically connected to external connection terminals 49*a* and 49*b* by wiring which is not shown. More specifically, the connection terminal 46*a* is electrically connected to the external connection terminal 49*a*, and the connection terminal 46*b* is electrically connected to the external connection terminal 49*b*. The external connection terminals 49*a* and 49*b* are provided on, for example, the surface of the frame 30 on the side mounted to the package or the like (surface of the base 10 on the main surface 10*b* side), and positions which overlap the package fixing portion 34 when seen in plan view.

As the excitation electrode, the extraction electrodes 44*a* and 44*b*, the connection terminals 46*a* and 46*b*, and the external connection terminals 49*a* and 49*b*, for example, a laminated body in which an Au layer is laminated on a Cr layer as an underlying layer is used. The excitation electrode, the extraction electrodes 44*a* and 44*b*, the connection terminals 46*a* and 46*b*, and the external connection terminals 49*a* and 49*b* are formed by, for example, forming a conductive layer (not shown) through a sputtering method or the like, and patterning the conductive layer.

The mass portions 50, 52, 54, and 56 are fixed to the main surfaces 13*a* and 13*b* of the movable portion 13 by, for example, the bonding member 62. More specifically, the mass portions 50 and 52 are fixed to the main surface 13*a*, and the mass portions 54 and 56 are fixed to the main surface 13*b*. The material of the mass portions 50, 52, 54, and 56 include, for example, metals such as Cu and Au. The detection sensitivity of the acceleration applied to the physical quantity detection device 100 can be improved by the mass portions 50, 52, 54, and 56.

The bonding member 62 for fixing the mass portion 50 is provided in the second fixing portion 16*a* of the movable portion 13, and the bonding member 62 for fixing the mass portion 52 is provided in the second fixing portion 16*b* of the movable portion 13. That is, the mass portion 50 is fixed to the second fixing portion 16*a*, and the mass portion 52 is fixed to the second fixing portion 16*b*.

As the bonding member 62, for example, a silicon resin-based thermosetting adhesive is used. It is preferable that the bonding member 62 be applied so as to bond the movable portion 13 and a portion of a range of the mass portions 50, 52, 54, and 56, from the viewpoint of thermal stress suppression.

Meanwhile, although not shown, the bonding member 62 for fixing the mass portion 54 may be provided at a position which overlaps the second fixing portion 16*a* when seen in plan view, and the bonding member 62 for fixing the mass portion 56 may be provided at a position which overlaps the second fixing portion 16*b* when seen in plan view.

In addition, although not shown, the mass portions 50 and 52 may be formed integrally with each other, to thereby form one mass portion. In this case, one second fixing portion to which the mass portion is fixed is provided. Similarly, the mass portions 54 and 56 may be formed integrally with each other, to thereby form one mass portion. In addition, the mass portions 54 and 56 on the main surface 13*b* side may not be provided.

Figure 5:
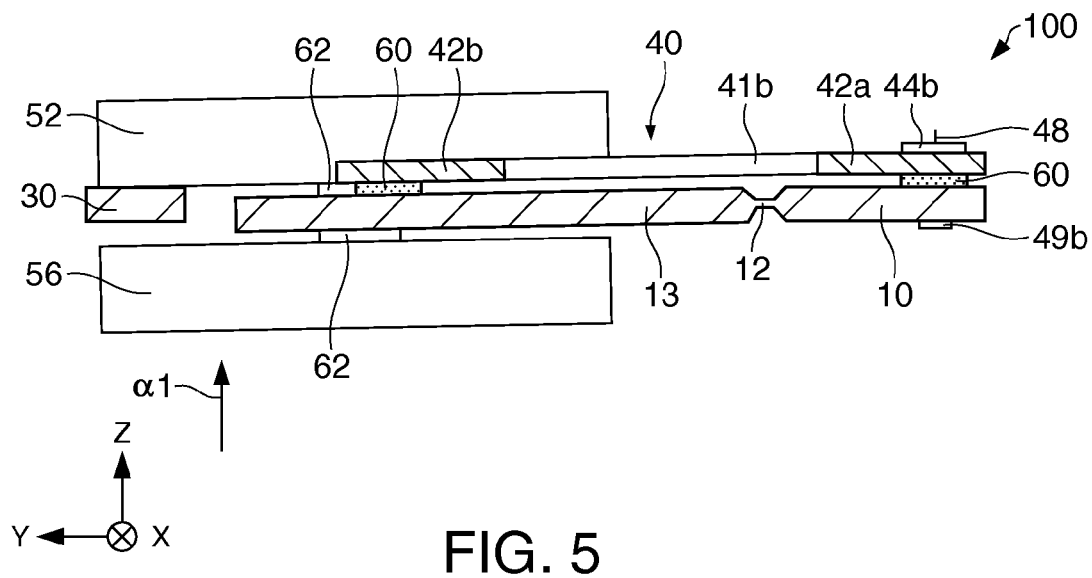
FIG. 5 is a cross-sectional view for explaining an operation of the physical quantity detection device according to the first embodiment.
Figure 6:
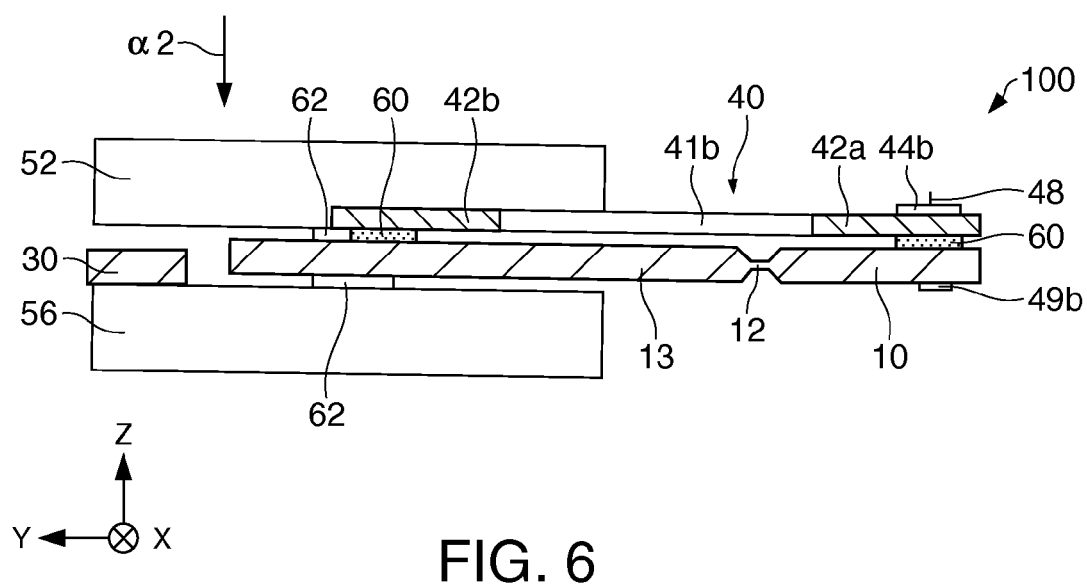
FIG. 6 is a cross-sectional view for explaining the operation of the physical quantity detection device according to the first embodiment.

Next, an operation of the physical quantity detection device 100 will be described. FIGS. 5 and 6 are cross-sectional views for explaining an operation of the physical quantity detection device 100.

As shown in FIG. 5, when the acceleration in the direction of arrow α1 (+Z direction) is applied to the physical quantity detection device 100, force acts on the movable portion 13 in the −Z direction, and the movable portion 13 is displaced in the −Z direction using the coupling portion 12 as a fulcrum. Thereby, force in the direction in which the basal portion 42*a* and the basal portion 42*b* are separated from each other along the Y-axis is applied to the physical quantity detection element 40, and thus tensile stress occurs in the vibrating beams 41*a* and 41*b*. For this reason, the vibration frequency (resonance frequency) of the vibrating beams 41*a* and 41*b* becomes higher.

On the other hand, as shown in FIG. 6, when the acceleration in the direction of arrow α2 (−Z direction) is applied to the physical quantity detection device 100, force acts on the movable portion 13 in the +Z direction, and the movable portion 13 is displaced in the +Z direction using the coupling portion 12 as a fulcrum. Thereby, force in the direction in which the base 42*a* and the base 42*b* come close to each other along the Y-axis is applied to the physical quantity detection element 40, and thus compressive stress occurs in the vibrating beams 41*a* and 41*b*. For this reason, the resonance frequency of the vibrating beams 41*a* and 41*b* becomes low.

In the physical quantity detection device 100, a change in the resonance frequency of the physical quantity detection element 40 as mentioned above is detected. More specifically, the acceleration applied to the physical quantity detection device 100 is derived by conversion into a numerical value set by a look-up table or the like, in accordance with the rate of change of the above-mentioned detected resonance frequency.

Meanwhile, when the physical quantity detection device 100 is used in a clinometer, the direction in which the gravitational acceleration is applied to the clinometer changes in accordance with a change in the inclination posture, and thus tensile stress or compressive stress occurs in the vibrating beams 41*a* and 41*b*. The resonance frequency of the vibrating beams 41*a* and 41*b* changes.

In addition, in the above-mentioned example, an example in which a so-called tuning bi-fork element is used as the physical quantity detection element 40 has been described. However, when the resonance frequency changes in accordance with the displacement of the movable portion 13, the configuration of the physical quantity detection element is not particularly limited. In addition, in the above-mentioned example, although the physical quantity detection element 40 is provided on the main surface 13*a* side of the movable portion 13, the physical quantity detection element 40 may be provided on both surfaces of the main surface 13*a* side and the main surface 13*b* side.

The physical quantity detection device 100 according to the first embodiment has, for example, the following features.

According to the physical quantity detection device 100, the movable portion 13 includes the notch 20*a* intersecting the line L1 that links the first fixing portion 14 to which the physical quantity detection element 40 is fixed to the second fixing portion 16*a* to which the mass portion 50 is fixed. Further, the movable portion 13 includes the notch 20*b* intersecting the line L2 that links the first fixing portion 14 to which the physical quantity detection element 40 is fixed to the second fixing portion 16*b* to which the mass portion 52 is fixed. For this reason, even when stress occurs in the movable portion 13 (second fixing portions 16*a* and 16*b*) due to the difference between thermal expansion coefficients of the movable portion 13 and the mass portions 50 and 52, the transmission of the stress to the first fixing portion 14 can be suppressed by the notches 20*a* and 20*b*. That is, transmission of the stress to the physical quantity detection element 40 can be suppressed. As a result, the physical quantity detection device 100 can have a high detection sensitivity. In addition, since the transmission of the stress caused by the difference between thermal expansion coefficients to the physical quantity detection element 40 can be suppressed, the physical quantity detection device 100 can have good temperature characteristics.

According to the physical quantity detection device 100, the notches 20*a* and 20*b* are formed passing from one main surface 13*a* of the movable portion 13 to the other main surface 13*b* thereof. For this reason, it is possible to further suppress the transmission of stress (stress caused by the difference between thermal expansion coefficients of the movable portion 13 and the mass portions 50 and 52) to the physical quantity detection element 40 than in, for example, the case where the notch has a bottom.

According to the physical quantity detection device 100, the notches 20*a* and 20*b* are provided at positions which do not overlap the physical quantity detection element 40. For this reason, in the physical quantity detection device 100, it is possible to suppress a decrease in the sensitivity of the physical quantity detection element 40 due to the notches 20*a* and 20*b*.

According to the physical quantity detection device 100, when a thermosetting adhesive is used as the bonding member 62, stress may occur in the movable portion 13 (second fixing portions 16*a* and 16*b*) due to hardening and contraction of the thermosetting adhesive, but the transmission of the stress to the physical quantity detection element 40 through the first fixing portion 14 can be suppressed by the notches 20*a* and 20*b*.

Meanwhile, although not shown, two or more (for example four) package fixing portions 34 may be provided, and the center of gravity of the physical quantity detection device 100 may be located within a range surrounded by four package fixing portions. Thereby, the physical quantity detection device 100 can be fixed to an external member such as a package in a stable posture without being inclined in any of the directions (without being distorted). For example, when torsion occurs in the physical quantity detection device at the time of displacement of the movable portion due to the application of the acceleration, there is a problem that the detection sensitivity of the acceleration is reduced. In addition, there is a problem that damage occurs in the physical quantity detection device due to torsion and reliability is reduced. In the physical quantity detection device 100 of which the center of gravity is located within a range surrounded by a plurality of (for example, four) package fixing portions, the torsion can be suppressed as mentioned above, and thus such a problem can be solved.

1.2. Modification Examples

1.2.1. First Modification Example

Figure 7:
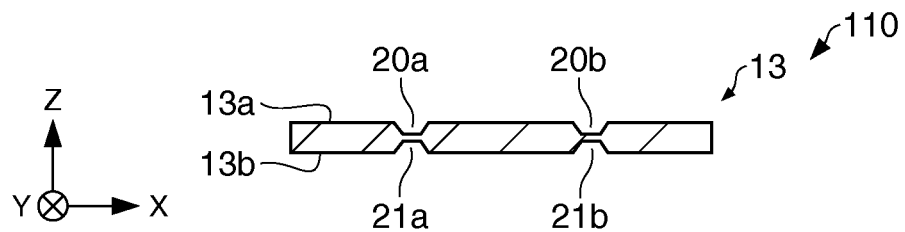
FIG. 7 is a cross-sectional view schematically illustrating a physical quantity detection device according to a first modification example of the first embodiment.

Next, a physical quantity detection device according to a first modification example of the first embodiment will be described with reference to the drawings. FIG. 7 is a cross-sectional view schematically illustrating a physical quantity detection device 110 according to the first modification example of the first embodiment, and corresponds to FIG. 4.

Hereinafter, in the physical quantity detection device 110, constructional elements having the same functions as those of the above-mentioned physical quantity detection device 100 are denoted by the same reference numerals and signs, and the detailed description thereof will be omitted.

In the example of the physical quantity detection device 100, as shown in FIG. 4, the notches 20*a* and 20*b* are formed passing from one main surface 13*a* of the movable portion 13 to the other main surface 13*b* thereof.

On the other hand, in the physical quantity detection device 110, as shown in FIG. 7, the notches 20*a* and 20*b* have a bottom without passing from one main surface 13*a* of the movable portion 13 to the other main surface 13*b* thereof. That is, the notches 20*a* and 20*b* can have a bottom. In the example shown, the notches 20*a* and 20*b* are formed on the main surface 13*a* side, and notches 21*a* and 21*b* having a bottom are formed on the main surface 13*b* on the opposite side to the main surface 13*a*.

The notches 21*a* and 21*b* may be the same in shape as the notches 20*a* and 20*b*, and may be provided at positions which overlap the notches 20*a* and 20*b* when seen in plan view. Meanwhile, although not shown, the notches 21*a* and 21*b* on the main surface 13*b* side may not be provided.

According to the physical quantity detection device 110, since the notches 20*a* and 20*b* have a bottom, it is possible to increase the rigidity of the movable portion 13 as compared to the physical quantity detection device 100. For this reason, when the acceleration is applied to the physical quantity detection device 110, the movable portion 13 can be more stably operated without being distorted.

1.2.2. Second Modification Example

Next, a physical quantity detection device according to a second modification example of the first embodiment will be described with reference to the drawings. FIG. 8 is a plan view schematically illustrating a physical quantity detection device 120 according to the second modification example of the first embodiment.

Hereinafter, in the physical quantity detection device 120, constructional elements having the same functions as those of the above-mentioned physical quantity detection device 100 are denoted by the same reference numerals and signs, and the detailed description thereof will be omitted.

In the example of the physical quantity detection device 100, as shown in FIG. 2, the notches 20a and 20b are formed in a shape extended out from the lateral side 13e of the movable portion 13 along the Y-axis to the coupling portion 12 side.

Figure 8:
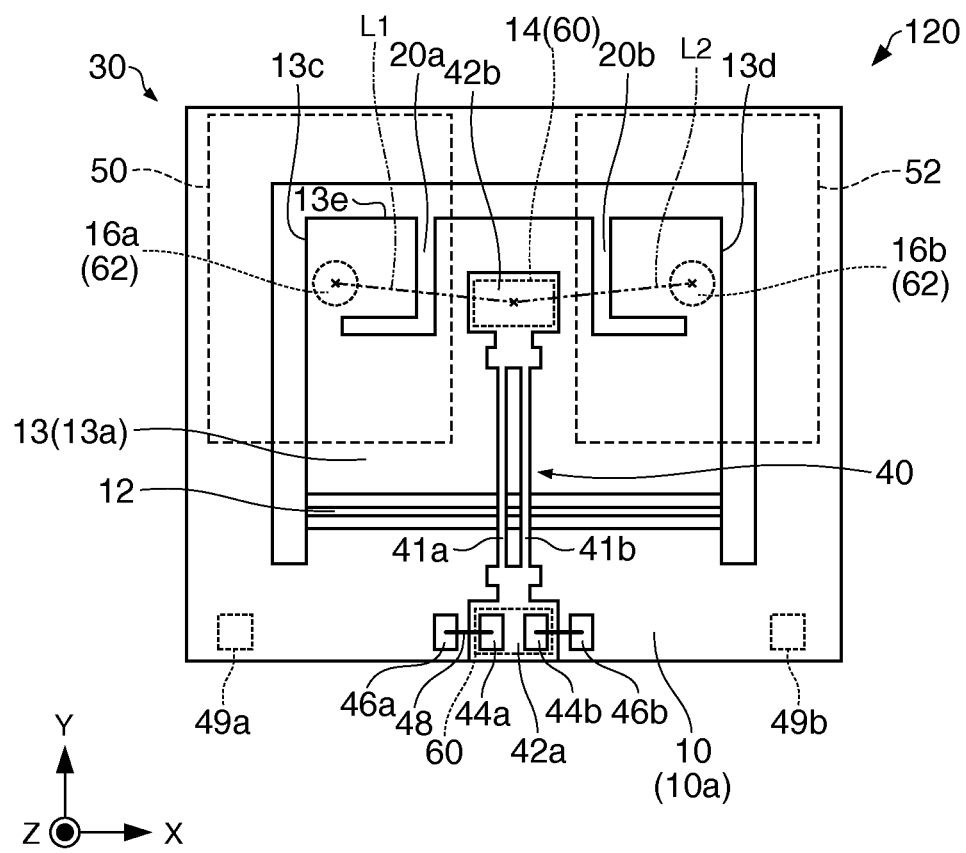
FIG. 8 is a plan view schematically illustrating a physical quantity detection device according to a second modification example of the first embodiment.

On the other hand, in the physical quantity detection device 120, as shown in FIG. 8, the notch 20a is formed in a shape having a portion extended out from the lateral side 13e along the Y-axis to the coupling portion 12 side, and a portion extended out from the above-mentioned portion along the X-axis to the lateral side 13c side. The notch 20b is formed in a shape having a portion extended out from the lateral side 13e along the Y-axis to the coupling portion 12 side, and a portion extended out from the above-mentioned portion along the X-axis to the lateral side 13d side. That is, the notches 20a and 20b have a substantially L-shaped planar shape.

According to the physical quantity detection device 120, similarly to the physical quantity detection device 100, the transmission of stress to the physical quantity detection element 40 can be suppressed by the notches 20a and 20b.

Meanwhile, insofar as the notches 20a and 20b are provided intersecting the lines L1 and L2 so as not to overlap the physical quantity detection element 40 and are separated from the coupling portion 12, the shape thereof is not particularly limited.

1.2.3. Third Modification Example

Next, a physical quantity detection device according to a third modification example of the first embodiment will be described with reference to the drawings. FIG. 9 is a plan view schematically illustrating a physical quantity detection device 130 according to the third modification example of the first embodiment.

Hereinafter, in the physical quantity detection device 130, constructional elements having the same functions as those of the above-mentioned physical quantity detection device 100 are denoted by the same reference numerals and signs, and the detailed description thereof will be omitted.

Figure 9:
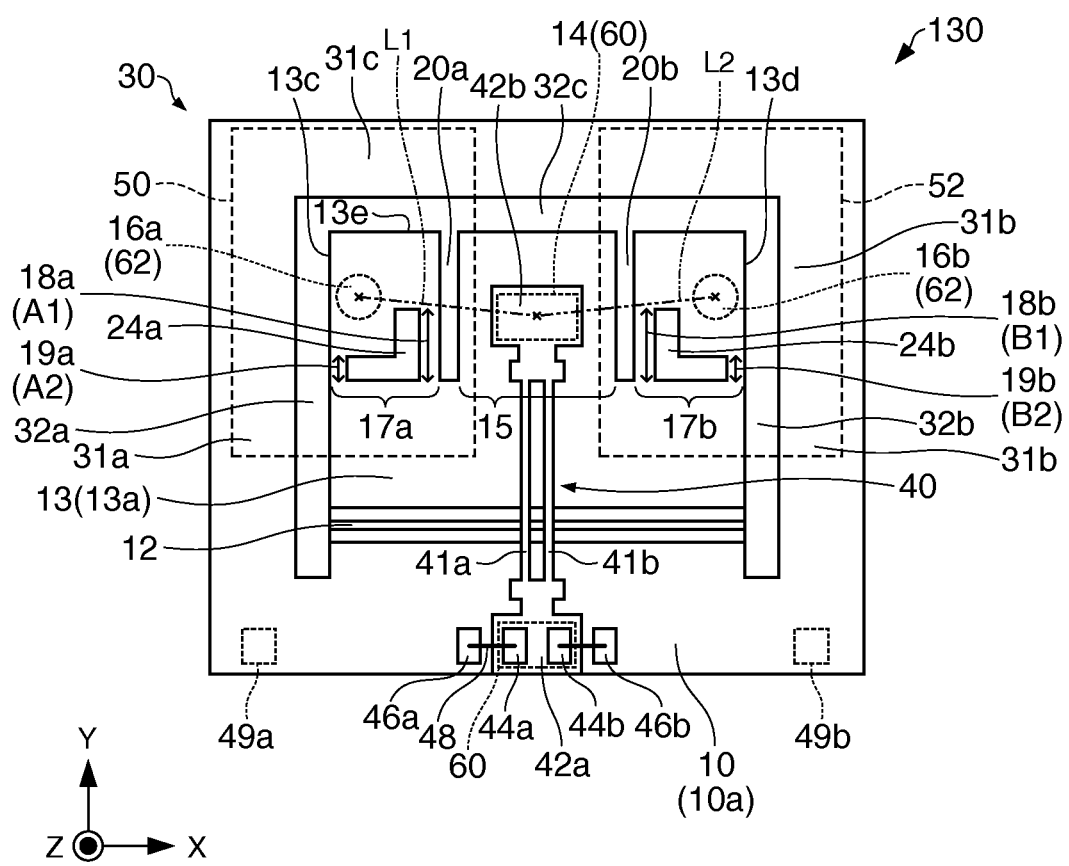
FIG. 9 is a plan view schematically illustrating a physical quantity detection device according to a third modification example of the first embodiment.

In the physical quantity detection device 130, as shown in FIG. 9, the movable portion 13 has openings 24a and 24b. In this regard, the physical quantity detection device 130 is different from the physical quantity detection device 100 shown in FIG. 2.

At least a portion of the opening 24a is provided in the second leg 17a of the movable portion 13. In the example shown, the opening 24a is completely provided within the second leg 17a. The opening 24a is provided separated from the second fixing portion 16a, and is formed further toward the coupling portion 12 side than the second fixing portion 16a, and on the first leg 15 side (notch 20a side).

The second leg 17a can include a first beam 18a provided between the opening 24a and the notch 20a, and a second beam 19a provided between the opening 24a and the gap 32a. The second beam 19a may be provided between the opening 24a and the lateral side 13c of the movable portion 13 (lateral side along the Y-axis when seen in plan view of the movable portion 13 (lateral side along the direction intersecting the rotation-axis direction of the movable portion 13)). The beams 18a and 19a are provided along the Y-axis, and the length A2 of the second beam 19a in the Y-axis direction is smaller than the length A1 of the first beam 18a in the Y-axis direction. The beams 18a and 19a are, for example, the root portion of the second leg 17a, and the portion having a constant width (portion having a constant length in the X-axis direction). In the example shown, the second fixing portion 16a is provided further toward the gap 32a side than the notch 20a side. That is, the second fixing portion 16a is provided along the X-axis further toward the second beam 19a side than the first beam 18a.

Since the length A2 of the second beam 19a in the Y-axis direction is smaller than the length A1 of the first beam 18a in the Y-axis direction, the rigidity of the second beam 19a is higher than the rigidity of the first beam 18a. That is, the rigidity of the first beam 18a is lower than the rigidity of the second beam 19a, and the second leg 17a has a difference in rigidity along the X-axis (along the rotation-axis direction of the movable portion 13), further toward the coupling portion 12 side than the second fixing portion 16a.

At least a portion of the opening 24b is provided in the second leg 17b of the movable portion 13. In the example shown, the opening 24b is completely provided within the second leg 17b. The opening 24b is provided separated from the second fixing portion 16b, and is formed further on the coupling portion 12 side than the second fixing portion 16b, and on the first leg 15 side (notch 20b side).

The second leg 17b can include a first beam 18b provided between the opening 24b and the notch 20b, and a second beam 19b provided between the opening 24b and the gap 32b. The second beam 19b may be provided between the opening 24b and the lateral side 13d of the movable portion 13 (lateral side along the Y-axis when seen in plan view of the movable portion 13). The first beam 18b and the second beam 19b are provided along the Y-axis, and the length B2 of the second beam 19b in the Y-axis direction is smaller than the length B1 of the first beam 18b in the Y-axis direction. The first beam 18b and the second beam 19b are, for example, the root portions of the second leg 17b, and are the portions having constant widths (portions having constant lengths in the X-axis direction). In the example shown, the second fixing portion 16b is provided further on the gap 32b side than the notch 20b side. That is, the second fixing portion 16b is provided along the X-axis further on the second beam 19b side than the first beam 18b.

Since the length B2 of the second beam 19b in the Y-axis direction is smaller than the length B1 of the first beam 18b in the Y-axis direction, the rigidity of the second beam 19b is higher than the rigidity of the first beam 18b. That is, the rigidity of the first beam 18b is lower than the rigidity of the second beam 19b, and the second leg 17b has a difference in rigidity along the X-axis, further toward the coupling portion 12 side than the second fixing portion 16b.

According to the physical quantity detection device 130, even when stress occurs in the movable portion 13 (second fixing portions 16a and 16b) due to the difference between thermal expansion coefficients of the movable portion 13 and the mass portions 50 and 52, the transmission of the stress to the first fixing portion 14 can be further suppressed by the openings 24a and 24b. That is, the transmission of the stress to the physical quantity detection element 40 can be further suppressed.

According to the physical quantity detection device 130, the second beam 19a between the opening 24a and the gap 32a is smaller in length in the Y-axis direction than the first beam 18a between the opening 24a and the notch 20a. Similarly, the second beam 19b between the opening 24b and the gap 32b is smaller in length in the Y-axis direction than the first beam 18b between the opening 24b and the notch 20b. For this reason, the rigidity of the second beam 19a is higher than the rigidity of the first beam 18a, and the rigidity of the second beam 19b is higher than the rigidity of the first beam 18b. Therefore, particularly, when the second fixing portion 16a to which the mass portion 50 is fixed is formed further on the gap 32a side than the notch 20a side, and the second fixing portion 16b to which the mass portion 52 is fixed is formed further on the gap 32b side than the notch 20b side, it is possible to increase the rigidity in the vicinity of the second fixing portions 16a and 16b of the movable portion 13 in the physical quantity detection device 130. Thereby, it is possible to suppress torsion occurring in the movable portion 13, and to suppress a decrease in the detection sensitivity of the acceleration. That is, in order to suppress the torsion more effectively at the time of the acceleration detection, the inclination angle detection and the like, it is preferable that the second fixing portions 16a and 16b are brought closer to the second beams 19a and 19b than the first beams 18a and 18b along the rotation axis of the movable portion 13 (along the X-axis), for example, as shown in FIG. 9.

Herein, generally, in the movable portion in the vicinity of the fixing portion to which the mass portion is fixed, torsion easily occurs due to the mass portion when the movable portion is displaced by the application of the acceleration. When the torsion occurs in the movable portion, a problem that the detection sensitivity of the acceleration decreases may occur.

However, in the physical quantity detection device 130, as mentioned above, since the second beams 19a and 19b are smaller in length in the Y-axis direction than the first beams 18a and 18b, it is possible to increase the rigidity of the second beams 19a and 19b, as compared to, for example, the case where the second beam is larger in length in the Y-axis direction than the first beam. For this reason, for example, as shown in FIG. 9, when the second fixing portions 16a and 16b are brought closer to the second beams 19a and 19b than the first beams 18a and 18b along the X-axis, it is possible to increase the rigidity in the vicinity of the second fixing portions 16a and 16b of the movable portion 13. As a result, it is possible to suppress the occurrence of torsion in the movable portion 13.

In addition, for example, as shown in FIG. 9, when the second fixing portions 16a and 16b are respectively brought closer to the second beams 19a and 19b than the first beams 18a and 18b along the X-axis, the fixed areas of the second fixing portions 16a and 16b can be widened to the extent that the lengths of the second beams 19a and 19b in the Y-axis direction are made smaller than the lengths of the first beams 18a and 18b in the Y-axis direction, thereby allowing the mass portions 50 and 52 to be tightly held.

Meanwhile, the openings 24a and 24b may be provided passing from one main surface 13a of the movable portion 13 to the other main surface 13b thereof. Thereby, it is possible to more reliably suppress the transmission of the stress to the physical quantity detection element 40. Alternatively, the openings 24a and 24b may have a bottom without passing from the main surface 13a to the other main surface 13b. Thereby, it is possible to further increase the rigidity of the movable portion 13.

In addition, the openings 24a and 24b may be provided separated from the lines L1 and L2, and may be provided intersecting the lines L1 and L2.

2. Second Embodiment

2.1. Physical Quantity Detection Device

Figure 10:
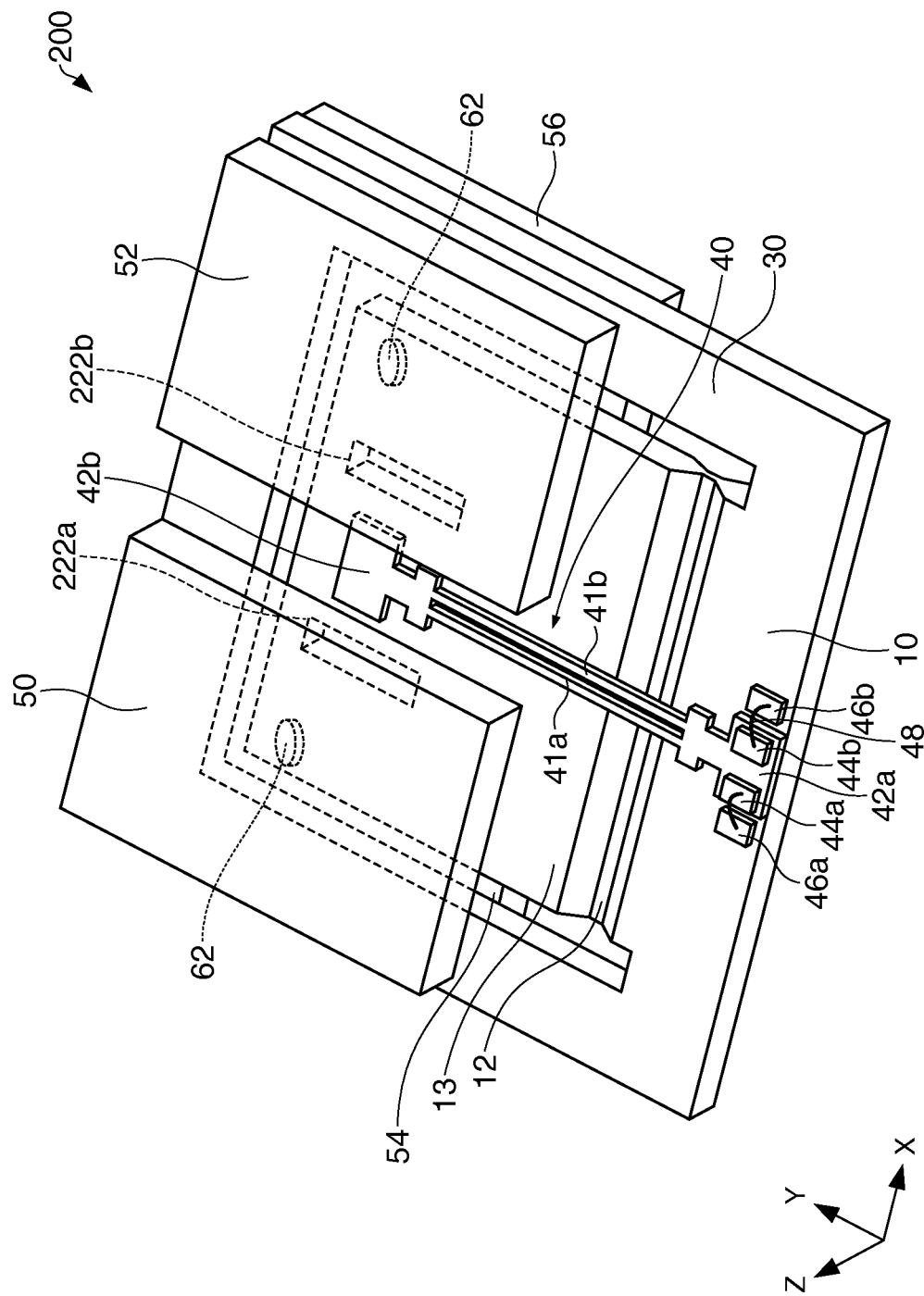
FIG. 10 is a perspective view schematically illustrating a physical quantity detection device according to a second embodiment.
Figure 11:
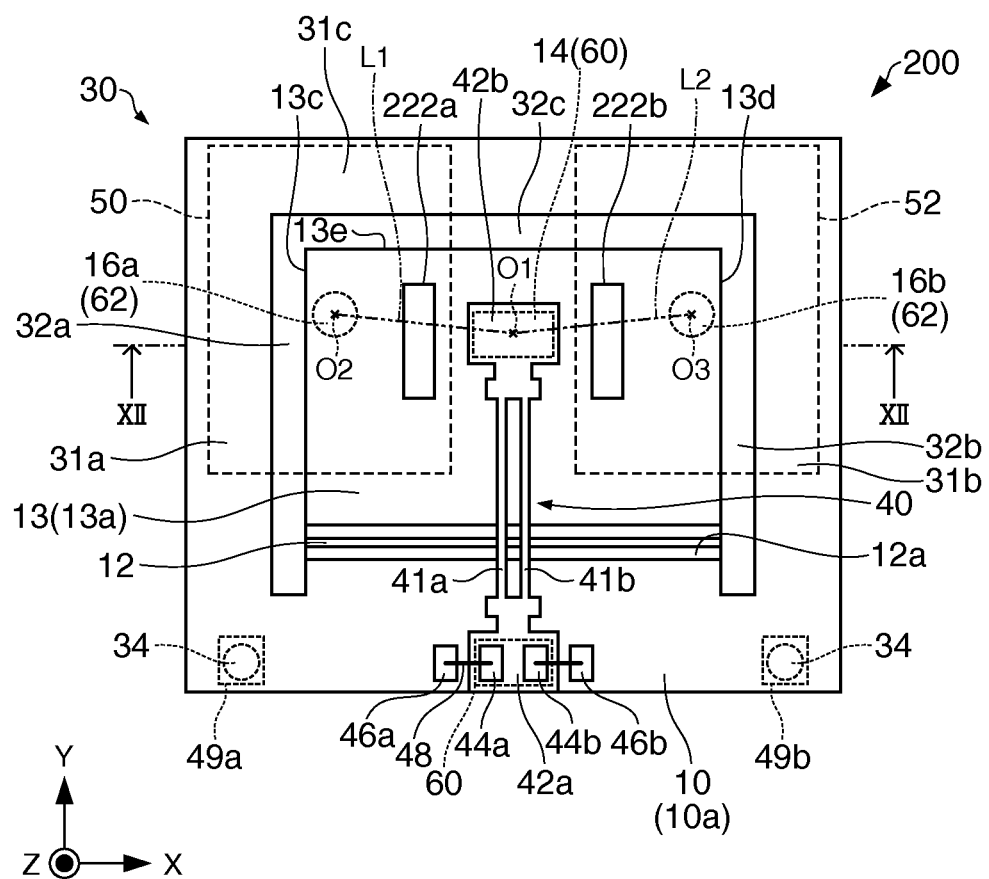
FIG. 11 is a plan view schematically illustrating the physical quantity detection device according to the second embodiment.
Figure 12:
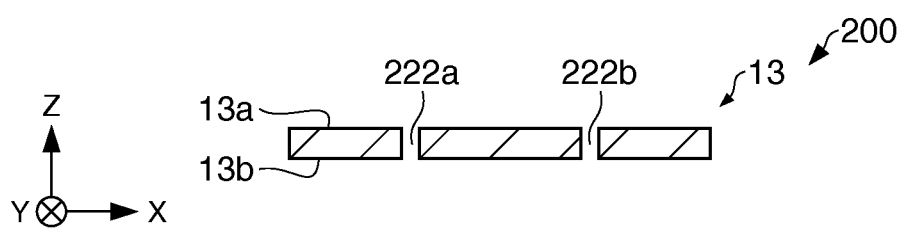
FIG. 12 is a cross-sectional view schematically illustrating the physical quantity detection device according to the second embodiment.

Next, a physical quantity detection device according to a second embodiment will be described with reference to the drawings. FIG. 10 is a perspective view schematically illustrating a physical quantity detection device 200 according to the second embodiment. FIG. 11 is a plan view schematically illustrating the physical quantity detection device 200 according to the second embodiment. FIG. 12 is a cross-sectional view taken along the line XII-XII of FIG. 11 which schematically illustrates the physical quantity detection device 200 according to the second embodiment. Meanwhile, in FIG. 11 and FIG. 14 described later, the mass portions 50, 52, 54, and 56 are shown in perspective for convenience. In addition, only the movable portion 13 is shown in FIG. 12.

Hereinafter, in physical quantity detection device 200, constructional elements having the same functions as those of the above-mentioned physical quantity detection device 100 are denoted by the same reference numerals and signs, and the detailed description thereof will be omitted.

In the example of the physical quantity detection device 100, as shown in FIG. 2, the movable portion 13 includes the notches 20a and 20b intersecting the lines L1 and L2.

On the other hand, in the physical quantity detection device 200, as shown in FIGS. 10 and 11, the movable portion 13 includes holes 222a and 222b intersecting the lines L1 and L2. More specifically, the hole 222a intersects the line L1, and the hole 222b intersects the line L2.

The holes 222a and 222b are separated from the lateral sides 13c, 13d, and 13e of the movable portion 13, and the coupling portion 12. The holes 222a and 222b are provided at positions which do not overlap the physical quantity detection element 40 when seen in plan view. The shape of the holes 222a and 222b is not particularly limited, but is rectangular in the example shown. As shown in FIG. 12, the holes 222a and 222b are provided passing from one main surface 13a of the movable portion 13 to the other main surface 13b thereof.

The physical quantity detection device 200 according to the second embodiment has, for example, the following features.

According to the physical quantity detection device 200, even when stress occurs in the movable portion 13 (second fixing portions 16a and 16b) due to the difference between thermal expansion coefficients of the movable portion 13 and the mass portions 50 and 52, the transmission of the stress to the first fixing portion 14 can be suppressed by the holes 222a and 222b. That is, similarly to the physical quantity detection device 100, the transmission of the stress to the physical quantity detection element 40 can be suppressed. As a result, the physical quantity detection device 200 can have a high detection sensitivity.

According to the physical quantity detection device 200, the holes 222a and 222b are formed passing from the one main surface 13a of the movable portion 13 to the other main surface 13b thereof. For this reason, it is possible to further suppress the transmission of stress (stress caused by the difference between thermal expansion coefficients of the movable portion 13 and the mass portions 50 and 52) to the physical quantity detection element 40 than in, for example, the case where the hole has a bottom.

According to the physical quantity detection device 200, the holes 222a and 222b are provided at positions which do not overlap the physical quantity detection element 40. For this reason, in the physical quantity detection device 200, it is possible to suppress a decrease in the sensitivity of the physical quantity detection element 40 due to the holes 222a and 222b.

2.2. Modification Example

2.2.1. First Modification Example

Figure 13:
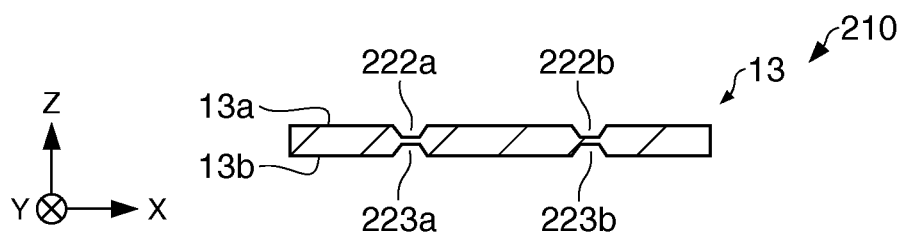
FIG. 13 is a cross-sectional view schematically illustrating a physical quantity detection device according to a first modification example of the second embodiment.

Next, a physical quantity detection device according to a first modification example of the second embodiment will be described with reference to the drawings. FIG. 13 is a cross-sectional view schematically illustrating a physical quantity detection device 210 according to the first modification example of the second embodiment, and corresponds to FIG. 12.

Hereinafter, in the physical quantity detection device 210, constructional elements having the same functions as those of the above-mentioned physical quantity detection device 200 are denoted by the same reference numerals and signs, and the detailed description thereof will be omitted.

In the example of the physical quantity detection device 200, as shown in FIG. 12, the holes 222a and 222b are formed passing from one main surface 13a of the movable portion 13 to the other main surface 13b thereof.

On the other hand, in the physical quantity detection device 210, as shown in FIG. 13, the holes 222a and 222b have a bottom without passing from the one main surface 13a of the movable portion 13 to the other main surface 13b thereof. That is, the holes 222a and 222b can have a bottom. In the example shown, the holes 222a and 222b are formed on the main surface 13a side, and holes 223a and 223b having a bottom are formed on the main surface 13b on the opposite side to the main surface 13a.

The holes 223a and 223b may be the same in shape as the holes 222a and 222b, and may be provided at positions which overlap the holes 222a and 222b when seen in plan view. Meanwhile, although not shown, the holes 223a and 223b on the main surface 13b side may not be provided.

According to the physical quantity detection device 210, since the holes 223a and 223b have a bottom, it is possible to increase the rigidity of the movable portion 13 as compared to the physical quantity detection device 200. For this reason, when the acceleration is applied to the physical quantity detection device 210, the movable portion 13 can be more stably operated without being distorted.

2.2.2. Second Modification Example

Figure 14:
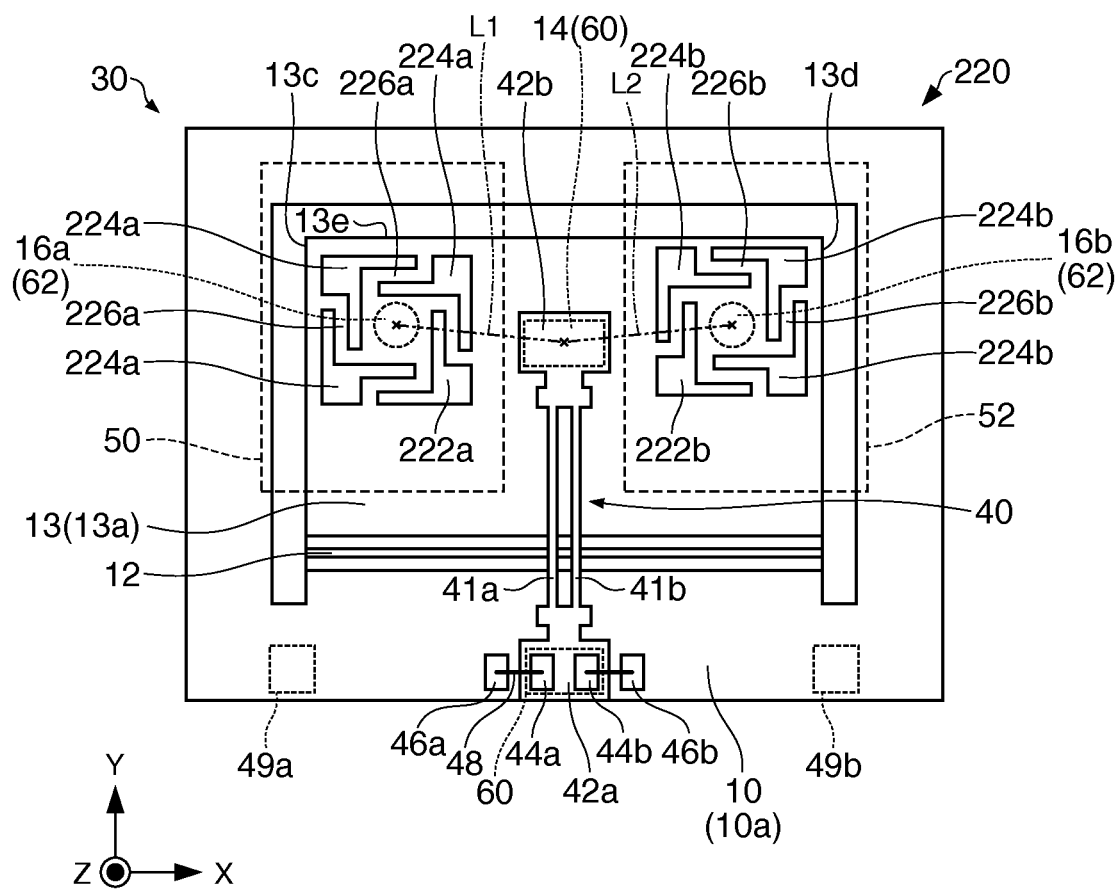
FIG. 14 is a plan view schematically illustrating a physical quantity detection device according to a second modification example of the second embodiment.

Next, a physical quantity detection device according to a second modification example of the second embodiment will be described with reference to the drawings. FIG. 14 is a plan view schematically illustrating a physical quantity detection device 220 according to the second modification example of the second embodiment.

Hereinafter, in the physical quantity detection device 220, constructional elements having the same functions as those of the above-mentioned physical quantity detection device 200 are denoted by the same reference numerals and signs, and the detailed description thereof will be omitted.

In the physical quantity detection device 220, as shown in FIG. 14, the movable portion 13 has a plurality of openings 224a and 224b. In this regard, the physical quantity detection device 210 is different from the physical quantity detection device 200 shown in FIG. 11.

In the physical quantity detection device 220, the second fixing portion 16a is surrounded by the hole 222a intersecting the line L1, and a plurality of openings 224a. The movable portion 13 has a support 226a of which the shape is defined by the hole 222a and a plurality of openings 224a. The support 226a is provided between the openings 224a adjacent to each other, and between the opening 224a and the hole 222a. The second fixing portion 16a is supported by the support 226a. In the example shown, three openings 224a are provided, and four supports 226a are provided.

The second fixing portion 16b is surrounded by the hole 222b intersecting the line L2, and a plurality of openings 224b. The movable portion 13 has a support 226b of which the shape is defined by the hole 222b and a plurality of openings 224b. The support 226b is provided between the openings 224b adjacent to each other, and between the opening 224b and the hole 222b. The second fixing portion 16b is supported by the support 226b. In the example shown, three openings 224b are provided, and four supports 226b are provided.

The openings 224a and 224b are separated from the lateral sides 13c, 13d, and 13e of the movable portion 13, and the coupling portion 12, and are formed at positions which do not overlap the physical quantity detection element 40 when seen in plan view. The openings 224a and 224b may be provided passing from one main surface 13a of the movable portion 13 to the other main surface 13b thereof, and may have a bottom without passing from the main surface 13a to the other main surface 13b.

The supports 226a and 226b have a flexural shape. The supports 226a and 226b may be elastic.

According to the physical quantity detection device 220, even when stress occurs in the movable portion 13 (second fixing portions 16a and 16b) due to the difference between thermal expansion coefficients of the movable portion 13 and the mass portions 50 and 52, the second fixing portions 16a and 16b are surrounded by a plurality of openings 224a and 224b, and thus the transmission of the stress to the first fixing portion 14 can be further suppressed.

According to the physical quantity detection device 220, the second fixing portions 16a and 16b are supported by the supports 226a and 226b having a flexural shape. The supports 226a and 226b can be elastic. For this reason, even when stress occurs in the movable portion 13 (second fixing portions 16a and 16b) due to the difference between the thermal expansion coefficients of the movable portion 13 and the mass portions 50 and 52, the stress can be relaxed by the supports 226a and 226b before the stress is transmitted to the first fixing portion 14.

Meanwhile, a concave portion formed by half-etching the movable portion 13 may be formed in the second fixing portions 16a and 16b. The bonding member 62 may be disposed within the concave portion. Thereby, it is possible to suppress extrusion of the bonding member 62 from a predetermined position.

2.2.3. Third Modification Example

Figure 15:
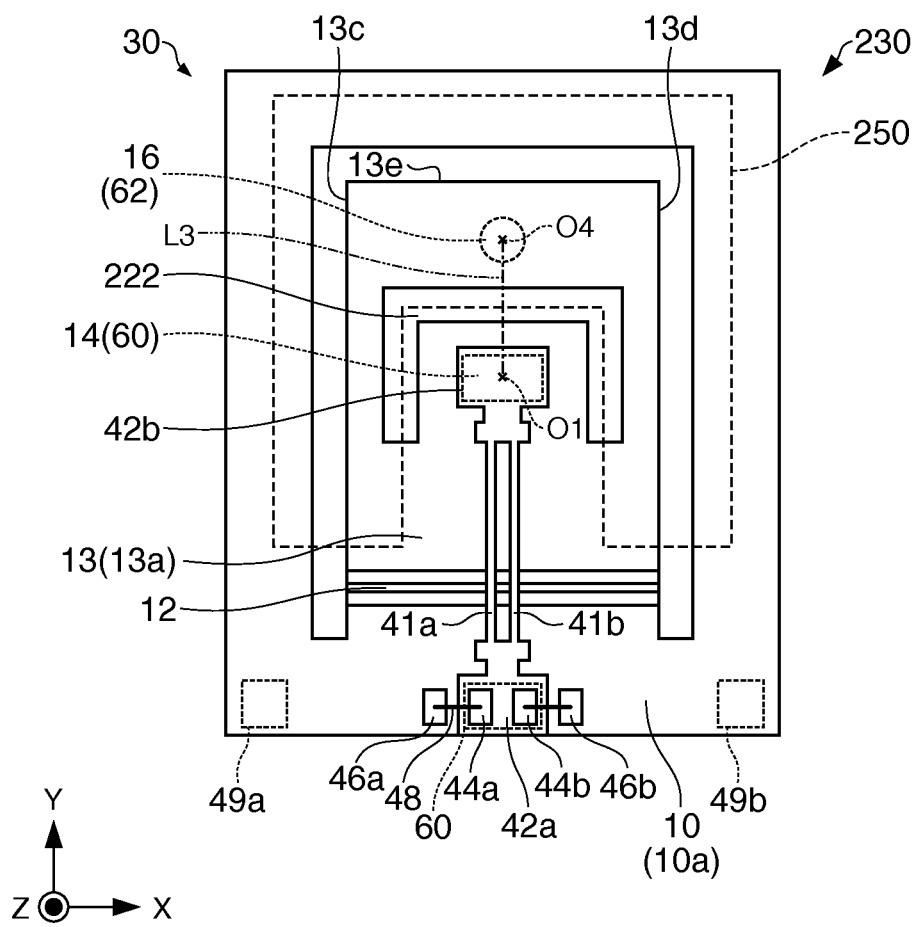
FIG. 15 is a plan view schematically illustrating a physical quantity detection device according to a third modification example of the second embodiment.

Next, a physical quantity detection device according to a third modification example of the second embodiment will be described with reference to the drawings. FIG. 15 is a plan view schematically illustrating a physical quantity detection device 230 according to the third modification example of the second embodiment.

Hereinafter, in the physical quantity detection device 230, constructional elements having the same functions as those of the above-mentioned physical quantity detection device 200 are denoted by the same reference numerals and signs, and the detailed description thereof will be omitted.

In the example of the physical quantity detection device 200, as shown in FIG. 11, two mass portions 50 and 52 are fixed to the main surface 13a of the movable portion 13.

On the other hand, in the physical quantity detection device 230, as shown in FIG. 15, one mass portion 250 is fixed to the main surface 13a of the movable portion 13. Meanwhile, in FIG. 15, the mass portion 250 is shown in perspective for convenience.

The shape of the mass portion 250 is not particularly limited. However, in the example shown, the mass portion is extended out from the lateral side 13e to the vicinity of the coupling portion 12 in a bifurcated shape while bypassing the physical quantity detection element 40, and has a substantially U-shaped planar shape. The material of the mass portion 250 includes, for example, metals such as Cu and Au.

The movable portion 13 has a hole 222. The hole 222 is provided intersecting the line L3 (virtual line L3) that links the first fixing portion 14 to which the basal portion 42b of the physical quantity detection element 40 is fixed through the bonding member 60 to the second fixing portion 16 to which the mass portion 250 is fixed through the bonding member 62. More specifically, the line L3 is a line that links the center O1 of the first fixing portion 14 to the center O4 of the second fixing portion 16.

The hole 222 is separated from the lateral sides 13c, 13d, and 13e of the movable portion 13, and coupling portion 12, and is formed at a position which does not overlap the physical quantity detection element 40 when seen in plan view. The planar shape of the hole 222 is not particularly limited. However, in the example shown, the hole has a shape extended out from the lateral side 13e side to the vicinity of the vibrating beams 41a and 41b in a bifurcated shape while bypassing the basal portion 42b of the physical quantity detection element 40.

According to the physical quantity detection device 230, similarly to the physical quantity detection device 200, the transmission of the stress to the physical quantity detection element 40 can be suppressed.

Meanwhile, although not shown, the mass portion having the same shape as that of the mass portion 250 may be fixed to the main surface 13b (main surface on the opposite side to the main surface 13a) of the movable portion 13.

In addition, the hole 222 may be provided passing from one main surface 13a of the movable portion 13 to the other main surface 13b thereof, and may have a bottom without passing from the main surface 13a to the other main surface 13b.

3. Third Embodiment

Figure 16:
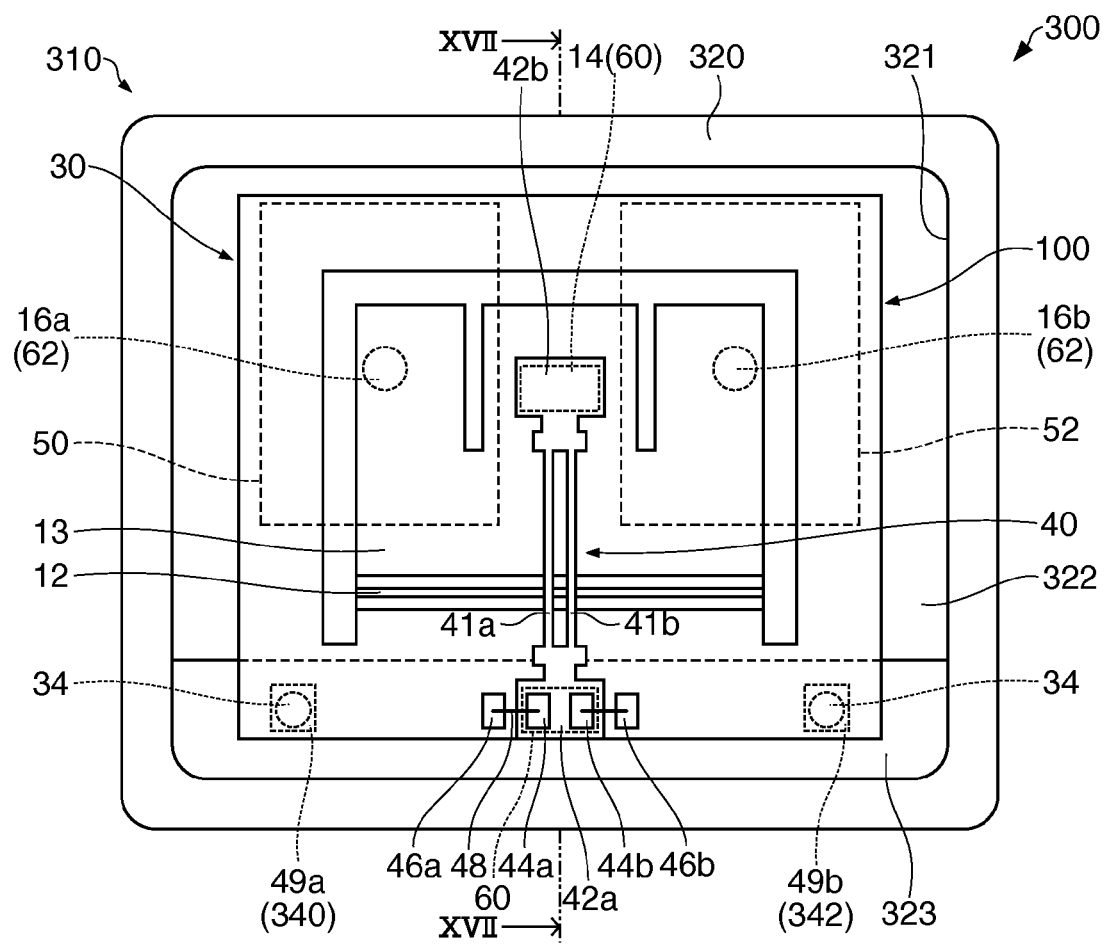
FIG. 16 is a plan view schematically illustrating a physical quantity detector according to a third embodiment.
Figure 17:
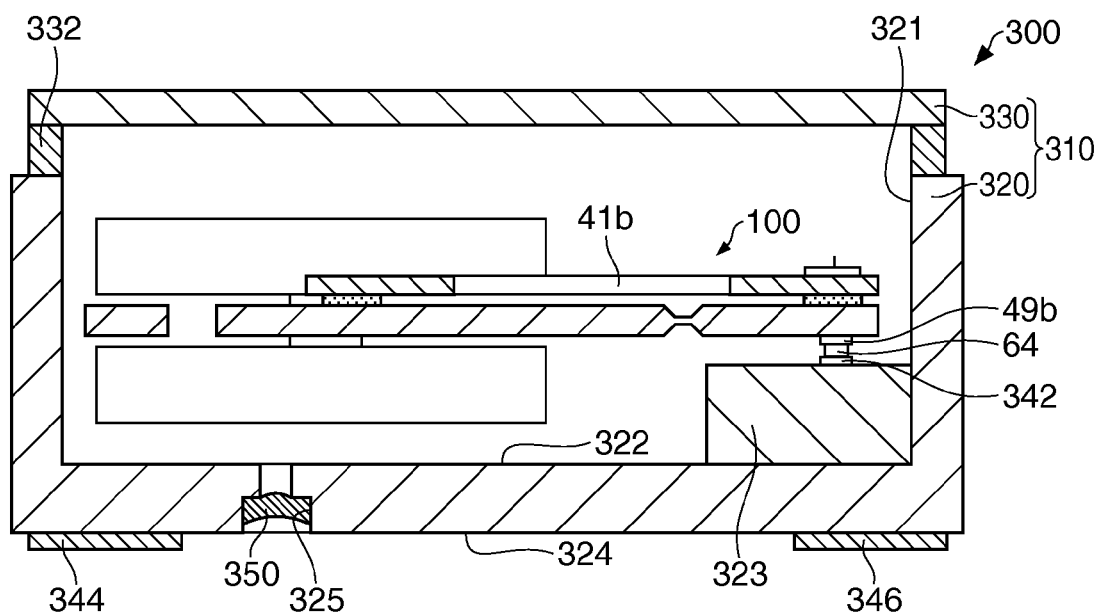
FIG. 17 is a cross-sectional view schematically illustrating the physical quantity detector according to the third embodiment.

Next, a physical quantity detector according to a third embodiment will be described with reference to the drawings. FIG. 16 is a plan view schematically illustrating a physical quantity detector 300 according to the third embodiment. FIG. 17 is a cross-sectional view taken along the line XVII-XVII of FIG. 16 which schematically illustrates the physical quantity detector 300 according to the third embodiment. Meanwhile, in FIG. 16, the mass portions 50, 52, 54, and 56 are shown in perspective for convenience.

As shown in FIGS. 16 and 17, the physical quantity detector 300 includes a physical quantity detection device according to the embodiment of the invention and a package 310. Hereinafter, an example will be described in which the physical quantity detection device 100 is used as the physical quantity detection device according to the embodiment of the invention.

The package 310 receives the physical quantity detection device 100. The package 310 can include a package base 320 and a lid 330. Meanwhile, in FIG. 16, the lid 330 is not shown for convenience.

A concave portion 321 is formed in the package base 320, and the physical quantity detection device 100 is disposed within the concave portion 321. The planar shape of the package base 320 is not particularly limited insofar as the physical quantity detection device 100 can be disposed within the concave portion 321. As the package base 320, for example, materials such as an aluminum oxide sintered body, quartz crystal, glass, and silicon obtained by forming, laminating and burning ceramic green sheet are used.

The package base 320 can have a step portion 323 protruding to the lid 330 side from an inner bottom (bottom on the inner side of the concave portion) 322 of the package base 320. The step portion 323 is, for example, provided along the inner wall of the concave portion 321. The step portion 323 is provided with internal terminals 340 and 342.

The internal terminals 340 and 342 are provided at positions facing (positions overlapping, when seen in plan view) the external connection terminals 49a and 49b provided in the frame 30 of the physical quantity detection device 100. For example, the external connection terminal 49a is electrically connected to the internal terminal 340, and the external connection terminal 49b is electrically connected to the internal terminal 342.

An outer bottom (surface on the opposite side to the inner bottom 322) 324 of the package base 320 is provided with external terminals 344 and 346 used at the time of mounting to an external member such as an electronic device. The external terminals 344 and 346 are electrically connected to the internal terminals 340 and 342 through internal wiring which is not shown. For example, the external terminal 344 is electrically connected to the internal terminal 340, and the external terminal 346 is electrically connected to the internal terminal 342.

The internal terminals 340 and 342 and the external terminals 344 and 346 are made of a metal film in which a film such as Ni and Au is laminated on a metallized layer such as W by a plating method or the like.

In the package base 320, a sealing portion 350 that seals the inside (cavity) of the package 310 is provided in the bottom of the concave portion 321. The sealing portion 350 is disposed within a through hole 325 formed in the package base 320. The through hole 325 passes from the outer bottom 324 to the inner bottom 322. In the example shown, the through hole 325 has a stepped shape of which the hole diameter on the outer bottom 324 side is larger than the hole diameter on the inner bottom 322 side. The sealing portion 350 is formed by disposing a sealing material made of, for example, an Au/Ge alloy, solder or the like in the through hole 325, and heating and melting followed by solidifying the sealing material. The sealing portion 350 is configured to seal the inside of the package 310 air-tightly.

The package fixing portion 34 of the frame 30 is fixed to the step portion 323 of the package base 320 through a bonding member 64. Thereby, the physical quantity detection device 100 is mounted to the package base 320, and is received within the package 310.

The package fixing portion 34 is fixed to the step portion 323, so that the external connection terminals 49a and 49b provided in the package fixing portion 34 and the internal terminals 340 and 342 provided in the step portion 323 are electrically connected to each other through the bonding member 64. As the bonding member 64, for example, a silicon resin-based conductive adhesive with which a conductive substance such as a metal filler is mixed is used.

The lid 330 is provided by covering the concave portion 321 of the package base 320. The lid 330 is, for example, plate-shaped. As the lid 330, for example, the same material as that of the package base 320, or metals such as Kovar, 42 alloy, and stainless steel are used. The lid 330 is bonded to the package base 320 through a bonding member 332 such as, for example, a seam ring, a low-melting-point glass, and an adhesive.

After the lid 330 is bonded to the package base 320, the sealing portion 350 is formed by disposing a sealing material within the through hole 325, heating and melting followed by solidifying the sealing material in a state (state having a high degree of vacuum) where the inside of the package 310 is decompressed, thereby allowing the inside of the package 310 to be sealed air-tightly. The inside of the package 310 may be filled with inert gas such as nitrogen, helium, and argon.

In the physical quantity detector 300, when a drive signal is applied to an excitation electrode of the physical quantity detection element 40 by way of the external terminals 344 and 346, the internal terminals 340 and 342, the external connection terminals 49a and 49b, the connection terminals 46a and 46b, and the like, the vibrating beams 41a and 41b of the physical quantity detection element 40 vibrate (resonate) at a predetermined frequency. The physical quantity detector 300 can output the resonance frequency of the physical quantity detection element 40, which changes in accordance with the applied acceleration, as an output signal.

The physical quantity detector 300 includes the physical quantity detection device 100 capable of suppressing the transmission of stress to the physical quantity detection element 40. For this reason, the physical quantity detector 300 can have a high detection sensitivity.

Meanwhile, although not shown, the concave portion in which the physical quantity detection device 100 is disposed may be formed at both the package base 320 and the lid 330, and may be formed at only the lid 330.

4. Fourth Embodiment

Figure 18:
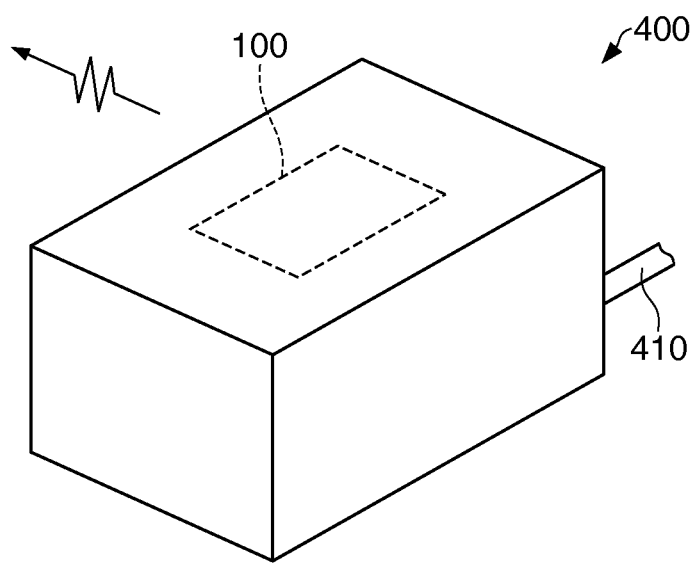
FIG. 18 is a perspective view schematically illustrating an electronic device according to a fourth embodiment.

Next, an electronic device according to a fourth embodiment will be described. Hereinafter, reference will be made to the drawings to describe a clinometer including the physical quantity device (physical quantity device 100 in the following example) according to the embodiment of the invention as the electronic device according to the fourth embodiment. FIG. 18 is a perspective view schematically illustrating a clinometer 400 according to the fourth embodiment.

As shown in FIG. 18, the clinometer 400 includes the physical quantity detection device 100 as an inclination sensor.

The clinometer 400 is installed on, for example, places to be measured such as the slope of a mountain, the slope of a road, and the retaining wall surface of an embankment. The clinometer 400 is supplied with a power supply from the outside through a cable 410, or has a power supply built-in, and a drive signal is sent to the physical quantity detection device 100 by a drive circuit which is not shown.

The clinometer 400 detects, using a detection circuit (not shown), a change in the posture of the clinometer 400 (change in the direction in which the gravitational acceleration is applied to the clinometer 400) from the resonance frequency which changes in accordance with the gravitational acceleration applied to the physical quantity detection device 100, converts the change into an angle, and transfers data to a base station, for example, wirelessly or the like. Thereby, the clinometer 400 can contribute to an early detection of abnormality.

The clinometer 400 includes the physical quantity detection device 100 capable of suppressing the transmission of stress to the physical quantity detection element 40. For this reason, the clinometer 400 can have a high detection sensitivity.

The physical quantity detection device according to the embodiment of the invention is not limited to the above-mentioned clinometer, but can be suitably used as an acceleration sensor, an inclination sensor and the like such as a seismometer, a navigation device, a posture control device, a game controller, and a cellular phone, and can provide an electronic device capable of accomplishing effects described in the above-mentioned embodiments and modification examples in any of the cases.

The above-mentioned embodiments and modification examples are an example, and are not limited thereto. For example, each of the embodiments and each of the modification examples can also be appropriately combined.

The invention includes substantially the same configuration (for example, configuration having the same function, method and result, or configuration having the same object and effect) as the configuration described in the embodiments. In addition, the invention includes a configuration in which a non-essential portion of the configuration described in the embodiments is substituted. In addition, the invention includes a configuration capable of accomplishing the same operation and effect or a configuration capable of achieving the same object as the configuration described in the embodiments. In addition, the invention includes a configuration in which a well-known technique is added to the configuration described in the embodiments.

The entire disclosure of Japanese Patent Application Nos. 2011-243470, filed Nov. 7, 2011, and 2011-248654, filed Nov. 14, 2011, are expressly incorporated by reference herein.

What is claimed is:

1. An acceleration sensor comprising:
   a base;
   a movable portion, provided in the base through a coupling portion, which is displaced in accordance with a change in a physical quantity;
   a physical quantity detection element which is fixed across the base and the movable portion; and
   a mass portion which is fixed to the movable portion,
   wherein the movable portion includes
   a first fixing portion to which the physical quantity detection element is fixed,
   a second fixing portion to which the mass portion is fixed, and
   a notch having a notched shape which is separated from the coupling portion, and reaches from a lateral side of the movable portion to a place intersecting a line that links the first fixing portion to the second fixing portion.

2. The acceleration sensor according to claim 1, wherein the notch is provided passing from one main surface of the movable portion to the other main surface thereof.

3. The acceleration sensor according to claim 1, wherein the notch has a bottom.

4. The acceleration sensor according to claim 1, wherein the notch is provided at a position which does not overlap the physical quantity detection element when seen in plan view.

5. The acceleration sensor according to claim 1, wherein the notch includes a structure extending in a direction intersecting a rotation-axis direction of the movable portion,
   a first leg having the first fixing portion and a second leg having the second fixing portion are provided by the notch,
   the second leg has a difference in rigidity along the rotation-axis direction, further toward the coupling portion side than the second fixing portion, and
   the rigidity of the second leg is lower on the first leg side than on the opposite side thereto.

6. The acceleration sensor according to claim 5, wherein the second leg includes an opening further on the coupling portion side than the second fixing portion.

7. The acceleration sensor according to claim 5, wherein the second leg includes a first beam which is provided between the opening and the notch, and a second beam which is provided between the opening and the lateral side of the movable portion along a direction intersecting the rotation-axis direction, and the rigidity of the first beam is lower than the rigidity of the second beam.

8. An acceleration sensor comprising:

a base;

a movable portion, provided in the base through a coupling portion, which is displaced in accordance with a change in a physical quantity;

a physical quantity detection element which is fixed across the base and the movable portion; and a mass portion which is fixed to the movable portion, wherein the movable portion includes a first fixing portion to which the physical quantity detection element is fixed, a second fixing portion to which the mass portion is fixed, and a hole which is separated from the coupling portion, and intersects a line that links the first fixing portion to the second fixing portion.

9. The acceleration sensor according to claim 8, wherein the hole is provided passing from one main surface of the movable portion to the other main surface thereof.

10. The acceleration sensor according to claim 8, wherein the hole has a bottom.

11. The acceleration sensor according to claim 8, wherein the hole is provided at a position which does not overlap the physical quantity detection element when seen in plan view.

12. The acceleration sensor according to claim 8, wherein the movable portion includes a plurality of openings, the second fixing portion is surrounded by the hole and the plurality of openings, the movable portion includes a support of which a shape is defined by the hole and the plurality of openings, and the second fixing portion is supported by the support.

13. A physical quantity detector comprising:

the acceleration sensor according to claim 1; and a package that receives the acceleration sensor.

14. A physical quantity detector comprising:

the acceleration sensor according to claim 2; and a package that receives the acceleration sensor.

15. A physical quantity detector comprising:

the acceleration sensor according to claim 8; and a package that receives the acceleration sensor.

16. A physical quantity detector comprising:

the acceleration sensor according to claim 9; and a package that receives the acceleration sensor.

17. An electronic device comprising the acceleration sensor according to claim 1.

18. An electronic device comprising the acceleration sensor according to claim 2.

19. An electronic device comprising the acceleration sensor according to claim 8.

20. An electronic device comprising the acceleration sensor according to claim 9.

* * * * *